United States Patent
Lee et al.

(10) Patent No.: US 12,512,073 B2
(45) Date of Patent: Dec. 30, 2025

(54) ADAPTIVE DISPLAY SYSTEM FOR VIEWER WITH SUNGLASSES

(71) Applicant: Toyota Motor Engineering & Manufacturing North America, Inc., Plano, TX (US)

(72) Inventors: Jae Seung Lee, Ann Arbor, MI (US); Ercan M. Dede, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 291 days.

(21) Appl. No.: 18/295,088

(22) Filed: Apr. 3, 2023

(65) Prior Publication Data
US 2024/0331650 A1   Oct. 3, 2024

(51) Int. Cl.
*G09G 3/36* (2006.01)
*G06F 3/14* (2006.01)
(Continued)

(52) U.S. Cl.
CPC ....... *G09G 3/36* (2013.01); *G09G 2320/0626* (2013.01); *G09G 2320/0666* (2013.01); *G09G 2354/00* (2013.01)

(58) Field of Classification Search
CPC ............. G09G 3/36; G09G 2320/0626; G09G 2320/0666; G09G 2354/00; G09G 5/37;
(Continued)

(56) References Cited

U.S. PATENT DOCUMENTS

| 6,870,529 | B1 | 3/2005 | Davis | |
| 7,570,785 | B2 * | 8/2009 | Breed | G06V 40/161 |
| | | | | 382/115 |

(Continued)

FOREIGN PATENT DOCUMENTS

| DE | 102015007485 A1 * | 2/2016 | ............... B60R 1/00 |
| KR | 20210123868 A * | 4/2020 | ............. B60K 35/00 |

OTHER PUBLICATIONS

Webb, F., "How to Tint Your Screen a Warmer Color in Windows 10", https://www.addictivetips.com/windows-tips/how-to-tint-your-screen-a-warmer-color-in-windows-10/, Apr. 12, 2017, 20 pages.
(Continued)

*Primary Examiner* — Wesner Sajous
(74) *Attorney, Agent, or Firm* — Jordan IP Law, LLC

(57) ABSTRACT

Adaptive display technology includes issuing one or more commands to perform a first adjustment to an output of a display to enhance visibility for a viewer of the display based on a determination that the viewer is wearing sunglasses, where the first adjustment includes adjusting one or more of a polarization of the display output, or a color of the display output based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the display output or a contrast of the display output, and issuing one or more commands to perform the second adjustment to the output of the display based on viewer feedback in relation to the second adjustment.

14 Claims, 4 Drawing Sheets

(51) Int. Cl.
*G06T 7/50* (2017.01)
*G09G 5/37* (2006.01)

(58) Field of Classification Search
CPC ........ G09G 5/28; G09G 2380/08; G06T 7/50; G06T 2207/10028; G06F 3/147; G06F 3/048; G06V 40/18; G06V 40/172
See application file for complete search history.

(56) References Cited

U.S. PATENT DOCUMENTS

| | | | |
|---|---|---|---|
| 9,290,146 B2* | 3/2016 | Breed | B60N 2/267 |
| 9,904,502 B2* | 2/2018 | Yan | G06F 1/1601 |
| 10,108,847 B2 | 10/2018 | Arikawa et al. | |
| 10,187,558 B2 | 1/2019 | Rolston | |
| 2008/0065291 A1* | 3/2008 | Breed | G08B 21/22 |
| | | | 382/190 |
| 2013/0261871 A1 | 10/2013 | Hobbs et al. | |
| 2017/0146801 A1 | 5/2017 | Stempora | |
| 2019/0318181 A1 | 10/2019 | Katz et al. | |
| 2022/0260844 A1 | 8/2022 | Yamaguchi | |
| 2022/0326507 A1 | 10/2022 | Rodrigues et al. | |
| 2022/0326552 A1 | 10/2022 | Rodrigues et al. | |
| 2023/0046973 A1* | 2/2023 | Kim | G02B 1/14 |
| 2023/0386429 A1* | 11/2023 | Lee | G09G 5/37 |

OTHER PUBLICATIONS

Liquid Crystal, Wikipedia https://en.wikipedia.org/w/index.php?title=Liquid_crystal&oldid=1138189746, 26 pages.

Polarization Using Sunglasses and a Computer Screen, Physics Lens, https://www.physicslens.com/polarization-using-sunglasses-and-a-computer-screen/, May 18, 2013, 3 pages.

Xiong, J et al., "Planar liquid crystal polarization optics for augmented reality and virtual reality: from fundamentals to applications", Official Journal of CIOMP, https://doi.org/10.1186/s43593-021-00003-x, 20 pages.

* cited by examiner

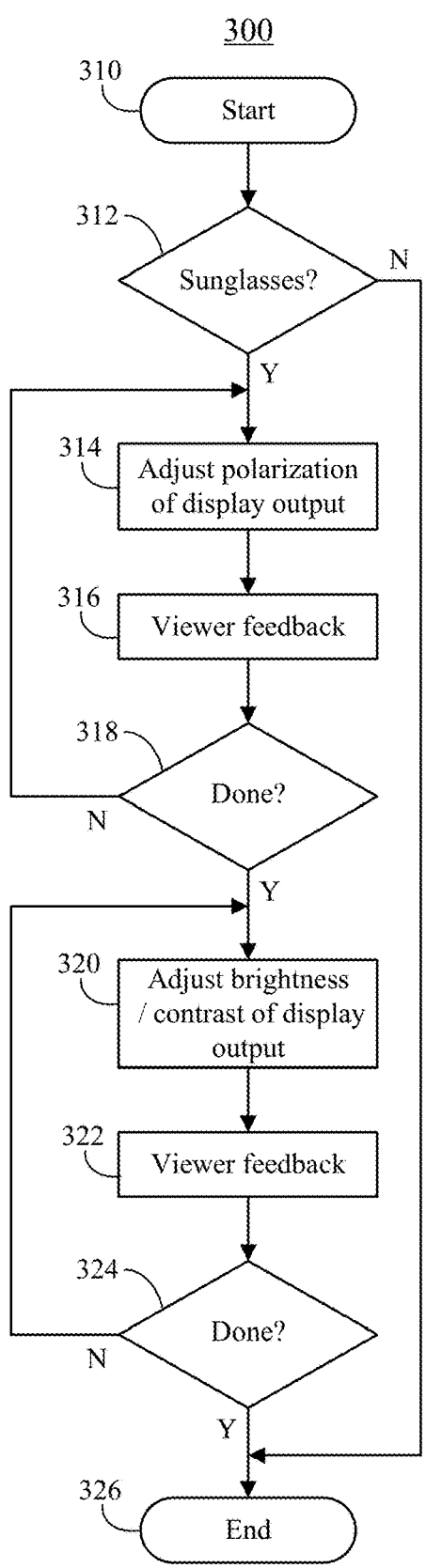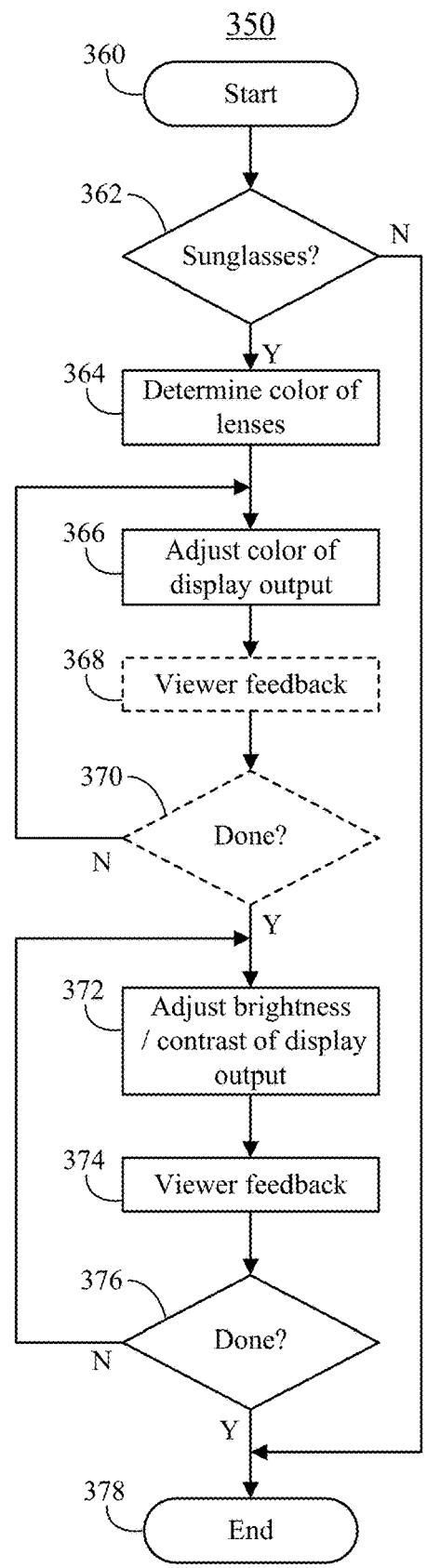
FIG. 3A
FIG. 3B

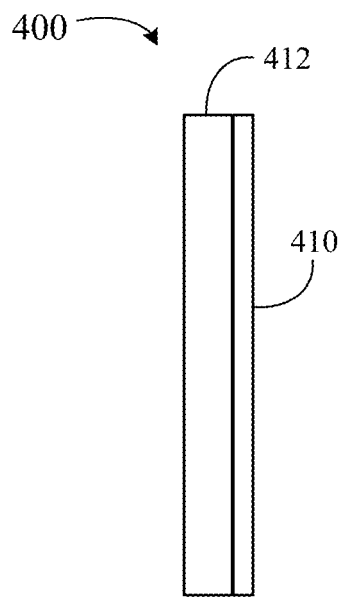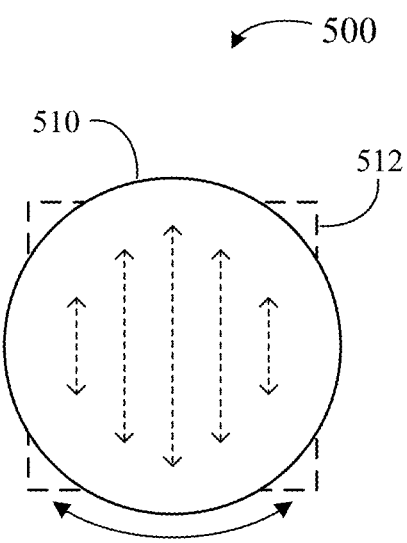
FIG. 4
FIG. 5
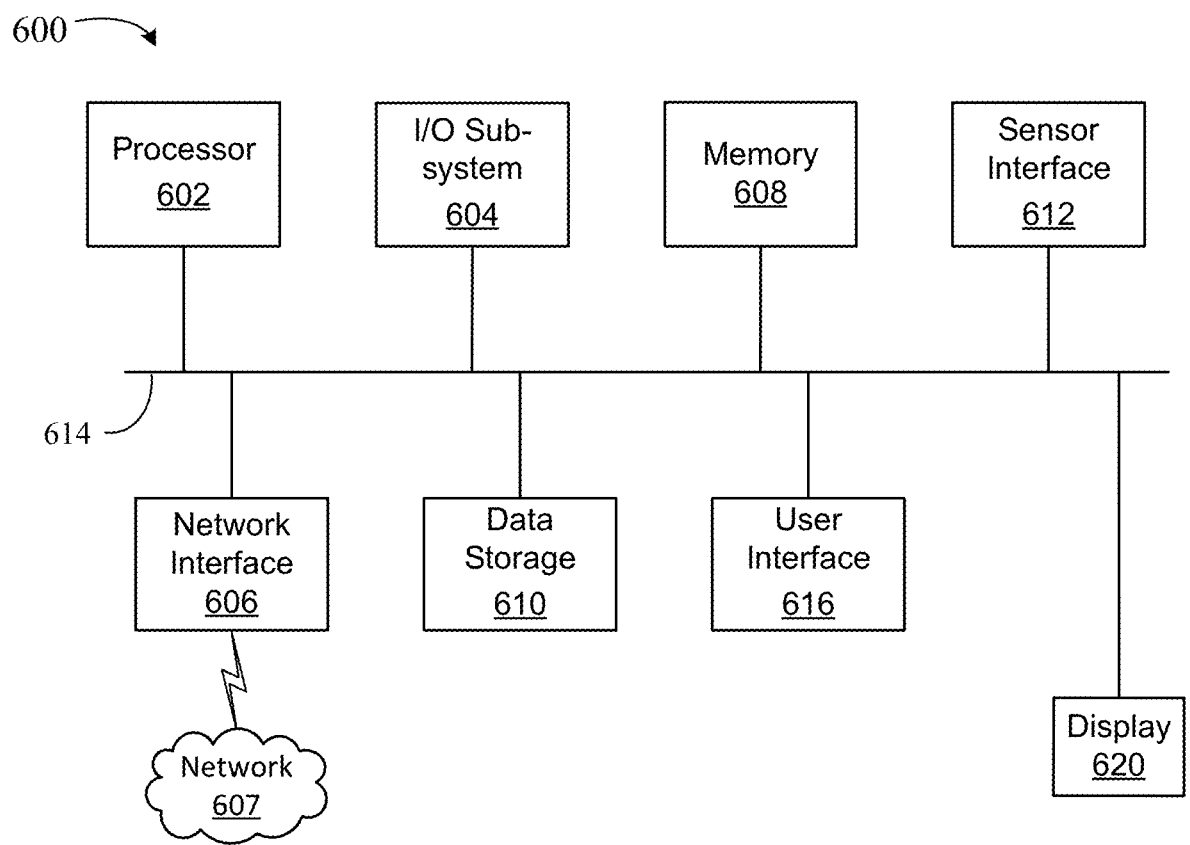
FIG. 6

ADAPTIVE DISPLAY SYSTEM FOR VIEWER WITH SUNGLASSES

TECHNICAL FIELD

Embodiments generally relate to display systems. More particularly, embodiments relate to an adaptive vehicle display system to adjust a display for a viewer wearing sunglasses.

BACKGROUND

Vehicle drivers and other display viewers wear sunglasses to reduce glare caused by sunshine or other bright lighting conditions. Use of sunglasses, however, can reduce the visibility of electronic displays, such as, e.g., displays in vehicles, mobile devices, or other displays such as outdoor displays.

BRIEF SUMMARY

In some embodiments, an adaptive display system includes a sensor, a processor coupled to the sensor, and memory coupled to the processor, the memory comprising instructions which, when executed by the processor, cause the processor to perform operations comprising issuing one or more first adjusting commands to perform a first adjustment to an output of a display to enhance visibility for a viewer of the display based on a determination that the viewer is wearing sunglasses, wherein the first adjustment includes adjusting one or more of a polarization of the output of the display, or a color of the output of the display based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the output of the display or a contrast of the output of the display, and issuing one or more second adjusting commands to perform the second adjustment to the output of the display based on first viewer feedback in relation to the second adjustment.

In some embodiments, a method includes issuing one or more first adjusting commands to perform a first adjustment to an output of a display to enhance visibility for a viewer of the display based on a determination that the viewer is wearing sunglasses, wherein the first adjustment includes adjusting one or more of a polarization of the output of the display, or a color of the output of the display based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the output of the display or a contrast of the output of the display, and issuing one or more second adjusting commands to perform the second adjustment to the output of the display based on first viewer feedback in relation to the second adjustment.

In some embodiments, at least one non-transitory computer readable storage medium includes instructions which, when executed by a processor, cause the processor to perform operations comprising issuing one or more first adjusting commands to perform a first adjustment to an output of a display to enhance visibility for a viewer of the display based on a determination that the viewer is wearing sunglasses, wherein the first adjustment includes adjusting one or more of a polarization of the output of the display, or a color of the output of the display based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the output of the display or a contrast of the output of the display, and issuing one or more second adjusting commands to perform the second adjustment to the output of the display based on first viewer feedback in relation to the second adjustment.

BRIEF DESCRIPTION OF THE SEVERAL VIEWS OF THE DRAWINGS

The various advantages of the embodiments will become apparent to one skilled in the art by reading the following specification and appended claims, and by referencing the following drawings, in which:

FIGS. 3A-3B provide a flow diagrams illustrating example processes for controlling an adaptive display system according to one or more embodiments;

FIG. 4 provides a diagram illustrating an example of a display assembly for use in an adaptive display system according to one or more embodiments;

FIG. 5 provides a diagram illustrating an example of another display assembly for use in an adaptive display system according to one or more embodiments;

FIG. 6 is a diagram illustrating an example of a controller for an adaptive display system according to one or more embodiments;

DETAILED DESCRIPTION

In accordance with the technology disclosed herein, an adaptive display system provides improved visibility of an electronic display for a sunglass-wearing viewer by adjusting (e.g., tuning) polarization and/or or color of the output of the display, followed by adjusting brightness and/or contrast of the display output. In addition to providing improved visibility of the display for the viewer, the technology can reduce power consumed by the display.

Figure 1:
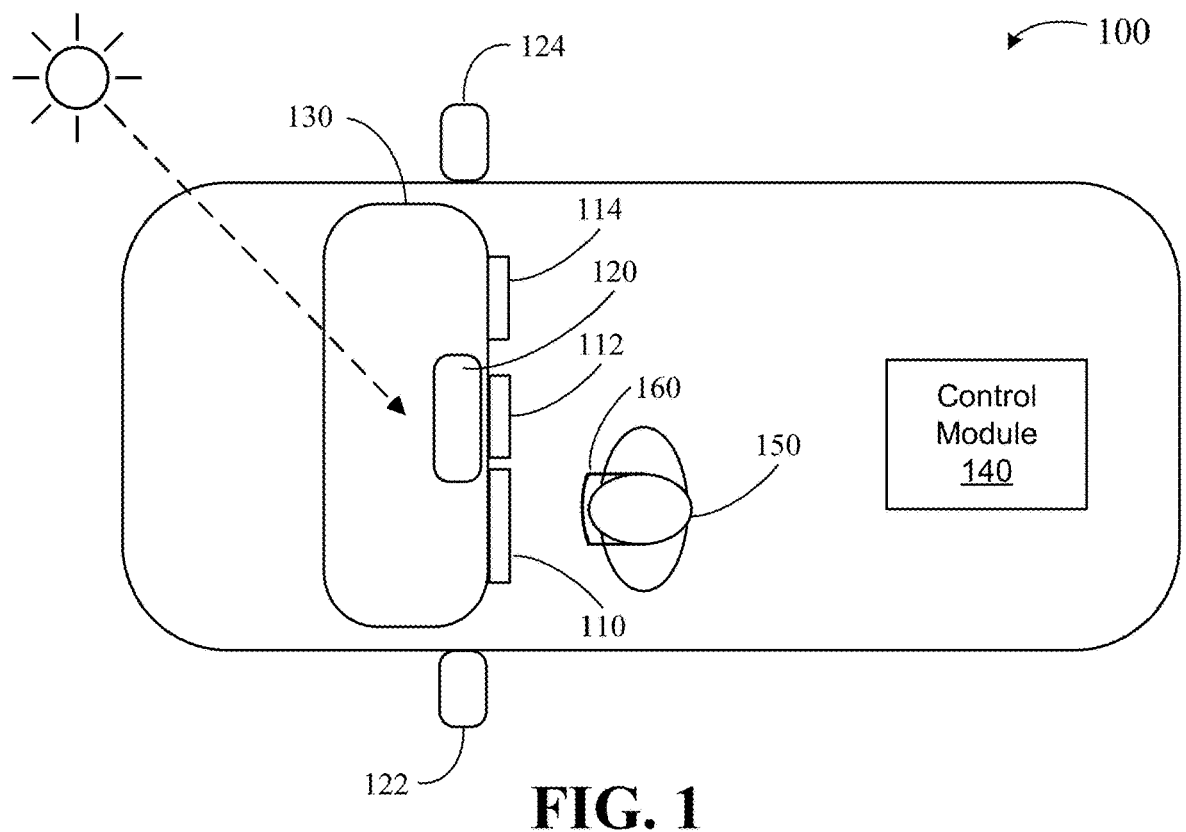
FIG. 1 provides a diagram illustrating an example of a vehicle in which an adaptive display system may be employed according to one or more embodiments.

FIG. 1 provides a diagram illustrating a top view of an example vehicle in which an adaptive display system 100 may be employed according to one or more embodiments according to one or more embodiments, with reference to components and features described herein including but not limited to the figures and associated description. The adaptive display system 100 can include one or more displays or display assemblies (denoted display/display assembly herein) to address limitations in visibility. As explained further herein, a display assembly includes a display. For example, in embodiments the adaptive display system 100 has one or more display/display assemblies including a first display/display assembly 110, a second display/display assembly 112, and/or a third display/display assembly 114, each located in or adjacent to a dashboard region of the vehicle. In some embodiments the adaptive display system 100 also includes one or more of a display/display assembly 120 (rear view mirror region), a display/display assembly 122 (left side mirror region), a display/display assembly 124 (right side mirror region), and/or a display/display assembly 130 (windshield region). In embodiments any one or more of the display/display assemblies 110, 112, 114, 120, 122, 124, and/or 130 is/are a display. In embodiments any one or more of the display/display assemblies 110, 112, 114, 120, 122, 124, and/or 130 is/are a display assembly. The adaptive display system 100 also includes a control module 140 (i.e., controller) to control the respective displays/display assemblies in the vehicle. In particular, as described herein the control module 140 adjusts one or more of a polarization or color of a display output to improve visibility of the display for a viewer 150 (e.g., a vehicle driver) wearing sunglasses 160. Additionally, after adjusting the polarization or color, the control module 140 also adjusts one or more of a brightness or a contrast of the display output to further improve visibility of the display for the viewer 150 wearing sunglasses 160.

Figure 2:
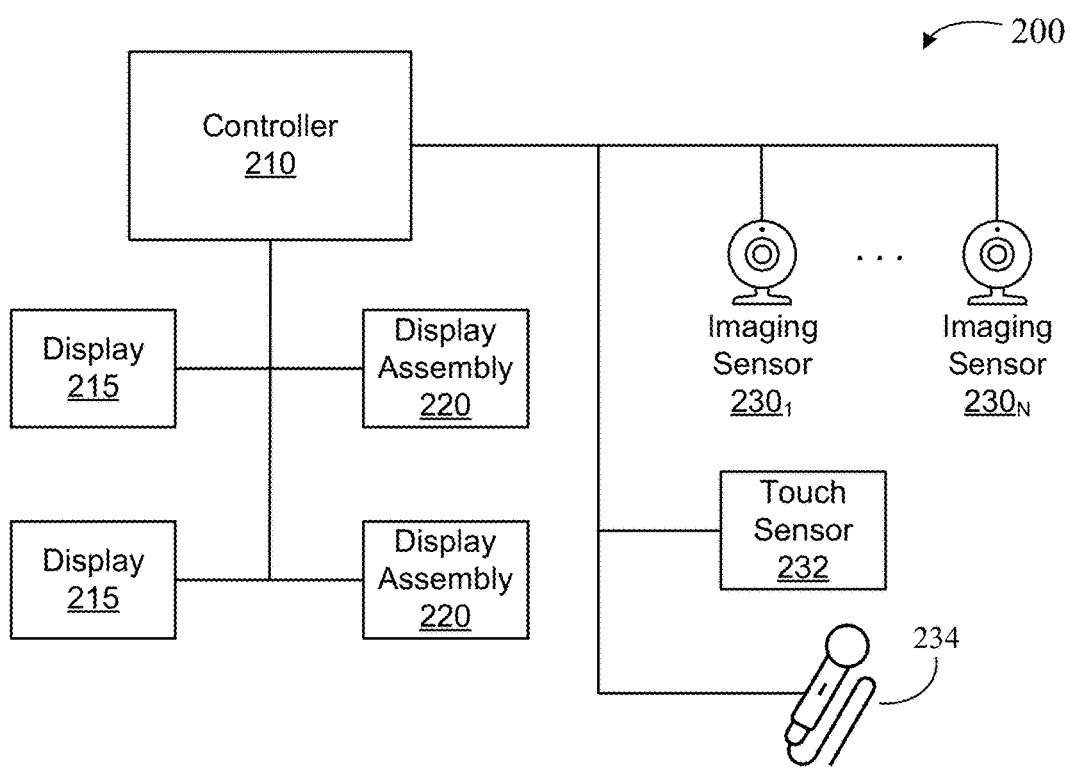
FIG. 2 provides a diagram illustrating an example of an adaptive display system according to one or more embodiments.

FIG. 2 is a diagram illustrating an example of an adaptive display system 200 according to one or more embodiments, with reference to components and features described herein including but not limited to the figures and associated description. In embodiments, the adaptive display system 200 corresponds to the adaptive display system 100 (FIG. 1, already discussed). As shown in FIG. 2, the example adaptive display system 200 includes a controller 210 (i.e., a control module), one or more displays 215 and/or one or more display assemblies 220, and one or more imaging sensors $230_i$ (e.g., shown as $230_1 \ldots 230_R$). The one or more imaging sensors $230_i$ can each include a camera or photosensor. In some embodiments, the adaptive display system 200 also includes a touch sensor 232 and/or a microphone 234.

In embodiments, the controller 210 includes a processor and is configured for data communication (such as, e.g., via a connection) with the other components of the adaptive display system 200. The controller 210 can communicate with, send or receive messages, commands, requests, notifications, data, etc. to/from other devices in the adaptive display system 200, including the one or more displays 215, the one or more display assemblies 220, the one or more imaging sensors $230_i$, the touch sensor 232, and/or the microphone 234. In embodiments, the controller 210 corresponds to the control module 140 (FIG. 1, already discussed). Further details regarding an example of a controller 210 are provided with reference to FIG. 6 herein.

Each display 215 and/or display assembly 220 is configured to provide a display output to a viewer (such as a driver). Each display 215 and/or display assembly 220 is coupled to or otherwise in data communication with the controller 210 via a wireless or wired connection. In embodiments a display 215 or a display assembly 220 corresponds to any one of the display/display assemblies 110, 112, 114, 120, 122, 124 or 130 (FIG. 1, already discussed). Examples of displays (either displays 215 or displays as part of display assemblies 220) can include displays in vehicles (e.g., dashboard displays, control panel displays, entertainment/information displays, multifunction screen displays, global positioning system (GPS) displays, etc.), displays in handheld devices (e.g., smartphones, tablets, cameras, personal GPS units, etc.), kiosk displays and/or other displays (e.g., outdoor displays).

In some embodiments, a display assembly 220 includes a tunable layer deployed on a viewable surface of the display.

In some alternative embodiments, a display assembly 220 includes an optically polarized layer rotatably arranged over a viewable surface of the display. Further details regarding examples of a display assembly 220 are provided with reference to FIGS. 4 and 5 herein.

Each imaging sensor $230_i$ is coupled to or otherwise in data communication with the controller 210 via a wireless or wired connection. Each imaging sensor $230_i$ includes a camera or other imaging device (e.g., an array of photosensors) configured to capture input images (e.g., visual images). The imaging sensors $230_i$ may be dispersed or placed (e.g., within a vehicle) in a manner to capture images of a viewer of a display (e.g., the driver) sufficient to determine whether the viewer is wearing sunglasses. For example, each display assembly can be accompanied by an imaging sensor, and/or an imaging sensor can be integrated into each display assembly. The imaging sensors $230_i$ can capture images generally in the visible light spectrum. In some embodiments, an imaging sensor $230_i$ can be sensitive to one or more frequency bands of light, such as, e.g., a red band, a blue band, a green band, an infrared band, an ultraviolet band, etc.

The touch sensor 232 is coupled to or otherwise in data communication with the controller 210 via a wireless or wired connection. The touch sensor 232 can be any type of sensor sensitive to touch, such as, e.g., a touch screen, and is configured to receive input touch sensations (e.g., from a viewer) and provide output signals (e.g., commands) to the controller 210. As an example, a touch sensor 232 can be integrated with any one or more of the displays 215 or the display assemblies 220. As an example, a touch sensor 232 can be integrated with a control device or component of a vehicle (e.g., as part of a control interface in a vehicle).

The microphone 234 is coupled to or otherwise in data communication with the controller 210 via a wireless or wired connection. The microphone 234 can be located in a place or position (e.g., within a vehicle) within sound range of a viewer, and is configured to receive sounds such as spoken voice commands uttered by a viewer. As an example, a microphone 234 can be integrated with any one or more of the displays 215 or display assemblies 220. As an example, a microphone 234 can be integrated with a control device or component of a vehicle (e.g., as part of a control interface in a vehicle).

Some or all components in the adaptive display system 200 can be implemented using one or more of a central processing unit (CPU), a graphics processing unit (GPU), an artificial intelligence (AI) accelerator, a field programmable gate array (FPGA) accelerator, an application specific integrated circuit (ASIC), and/or via a processor with software, or in a combination of a processor with software and an FPGA or ASIC. More particularly, components of the system 100 can be implemented in one or more modules as a set of program or logic instructions stored in a machine- or computer-readable storage medium such as random access memory (RAM), read only memory (ROM), programmable ROM (PROM), firmware, flash memory, etc., in hardware, or any combination thereof. For example, hardware implementations can include configurable logic, fixed-functionality logic, or any combination thereof. Examples of configurable logic include suitably configured programmable logic arrays (PLAs), FPGAs, complex programmable logic devices (CPLDs), and general purpose microprocessors. Examples of fixed-functionality logic include suitably configured ASICs, combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

For example, computer program code to carry out operations by the adaptive display system 200 can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

FIG. 3A provides a flow diagram illustrating an example process 300 for controlling an adaptive display system (such as, e.g., the adaptive display system 100 (FIG. 1, already discussed) and/or the adaptive display system 200 (FIG. 2, already discussed)) according to one or more embodiments, with reference to components and features described herein including but not limited to the figures and associated description. The process 300 can generally be implemented in the adaptive display system 100 (FIG. 1, already discussed), the adaptive display system 200 (FIG. 2, already discussed), the controller 600 (FIG. 6), and/or via components thereof (including, e.g., the control module 140 of FIG. 1 and/or the controller 210 of FIG. 2), already discussed). More particularly, the process 300 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the process 300 and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The process 300 starts at block 310. Illustrated processing block 312 provides for determining whether a viewer (such as, e.g., the driver) of a display (such as a display 215 or a display which is part of a display assembly 220 in FIG. 2, already discussed) is wearing sunglasses. Determining whether a viewer is wearing sunglasses can be made according to any technique(s) known to a person skilled in the art.

For example, in some embodiments images of the viewer are obtained from one or more of the imaging sensors $230_i$ and analyzed to determine if the viewer is wearing sunglasses. As another example, in some embodiments another sensor (e.g., photo sensor or reflection sensor) provides data to determine whether the viewer is wearing sunglasses. As another example, in some embodiments the viewer is queried and provides information (e.g., feedback) regarding wearing sunglasses.

If the viewer is not wearing sunglasses (No at block 312) the process ends at block 326. If it is determined that the viewer is wearing sunglasses (Yes at block 312), the process continues to block 314. Illustrated processing block 314 provides for adjusting polarization of the output of the display (e.g., the display that the viewer wearing sunglasses is viewing). Adjusting the polarization includes issuing one or more commands to the display or display assembly to perform the polarization adjustment on the output of the display.

In some embodiments, the display is part of a display assembly (e.g., a display assembly 220 in FIG. 2, already discussed) having a tunable layer deployed on a viewable surface of the display, and the polarization of the display output is adjusted through controlling a voltage applied to the tunable layer. For example, commands are issued to the display assembly to control the voltage applied to the tunable layer. Further details regarding examples of a display assembly having a tunable layer deployed on a viewable surface of the display, and adjusting polarization of the display output thereof, are provided with reference to FIG. 4 herein.

In some embodiments, the display is part of a display assembly (e.g., a display assembly 220 in FIG. 2, already discussed) having an optically polarized layer rotatably arranged over a viewable surface of the display, and the polarization of the display output is adjusted through rotating the optically polarized layer (e.g., via a motor) in relation to the viewable surface of the display. For example, commands are issued to the display assembly to rotate the optically polarized layer over the viewable surface of the display. Further details regarding examples of a display assembly having an optically polarized layer rotatably arranged over a viewable surface of the display, and adjusting polarization of the display output thereof, are provided with reference to FIG. 5 herein.

Illustrated processing block 316 provides for receiving viewer feedback based on the polarization adjustment (block 314). For example, in some embodiments viewer feedback includes commands to further adjust polarization and/or information regarding whether the polarization adjustment(s) already made have enhanced (e.g., improved) visibility and/or are sufficient. Viewer feedback can be presented, e.g., through one or more various techniques including gestures (e.g., hand gestures such as a circle, a swipe, etc.) captured by one or more imaging sensors $230_i$, touch controls captured via the touch sensor 232 (such as, e.g., a touch slider control), voice commands (or other voice prompts/feedback) captured via the microphone 234, and/or via other controls.

Illustrated processing block 318 provides for determining whether adjustments to polarization are completed. This determination is made based on the viewer feedback (block 316) and/or any further indication that the viewer is satisfied with the adjustments made to enhance visibility. Such further indication can include, for example, an absence of further viewer feedback within a period of time after some viewer feedback has already been provided (e.g., at block 316). If it is determined that the adjustments to polarization are not completed (No at block 318)—e.g., based on viewer commands or other feedback to perform additional adjustments to polarization, the process returns to block 314. In some embodiments, adjustments to polarization are made incrementally in response to viewer feedback, such that several adjustments may be made (e.g., in a recursive or repeating manner) until the viewer indicates that adjustments to polarization are completed.

If it is determined that the adjustments to polarization are completed (Yes at block 318), the process continues to block 320. Illustrated processing block 320 provides for adjusting brightness and/or contrast of the output of the display. In some embodiments, the display brightness and/or contrast is adjusted based on the current level of brightness or contrast of the display output. As one example, if the current level of display brightness (or contrast) is above a value (e.g., a threshold or average value) the brightness (or contrast) of the display output is reduced. In this way, power required for the display is reduced, thereby conserving power (e.g., vehicle power) consumed. As another example, if the current level of display brightness (or contrast) is below a value (e.g., a threshold or average value) the brightness (or contrast) of the display output is increased. In some embodiments, a backlight for the display is adjusted to effect a brightness or contrast adjustment. Adjusting the brightness and/or contrast includes issuing one or more commands to the display or display assembly (e.g., via a display controller in some embodiments) to perform the brightness/contrast adjustment on the output of the display.

Illustrated processing block 322 provides for receiving viewer feedback based on the brightness and/or contrast adjustment (block 320). For example, in some embodiments viewer feedback includes commands to further adjust brightness or contrast and/or information regarding whether the brightness or contrast adjustment(s) already made have enhanced (e.g., improved) visibility and/or are sufficient. Viewer feedback can be presented, e.g., through one or more various techniques including gestures (e.g., hand gestures such as a circle, a swipe, etc.) captured by one or more imaging sensors $230_i$, touch controls captured via the touch sensor 232, voice commands (or other voice prompts/feedback) captured via the microphone 234, and/or via other controls.

Illustrated processing block 324 provides for determining whether adjustments to brightness and/or contrast are completed. This determination is made based on the viewer feedback (block 322) and/or any further indication that the viewer is satisfied with the adjustments made to enhance visibility. Such further indication can include, for example, an absence of further viewer feedback within a period of time after some viewer feedback has already been provided (e.g., at block 322). If it is determined that the adjustments to brightness and/or contrast are not completed (No at block 324)—e.g., based on viewer commands or other feedback to perform additional adjustments to polarization, the process returns to block 320. In some embodiments, adjustments to brightness and/or contrast are made incrementally in response to viewer feedback, such that several adjustments may be made (e.g., in a recursive or repeating manner) until the viewer indicates that adjustments to brightness and/or contrast are completed. If it is determined that the adjustments to brightness and/or contrast are completed (Yes at block 324), the process ends at block 326.

In some embodiments, once polarization adjustments are completed (block 318), the brightness of the display output is reduced to a low level (before performing the second adjustment), then adjustments to increase the brightness level are made incrementally with viewer feedback (blocks 320-322) until the brightness adjustments are completed (block 324). In this way, by reducing the brightness to a low level and incrementally increasing the brightness to a desired level, a minimal acceptable brightness is set, thereby saving power consumption.

FIG. 3B provides a flow diagram illustrating an example process 350 for controlling an adaptive display system (such as, e.g., the adaptive display system 100 (FIG. 1, already discussed) and/or the adaptive display system 200 (FIG. 2, already discussed)) according to one or more embodiments, with reference to components and features described herein including but not limited to the figures and associated description. The process 350 can be performed as an alternative to or in combination with the process 300 (FIG. 3A, already discussed). The process 350 can generally be implemented in the adaptive display system 100 (FIG. 1, already discussed), the adaptive display system 200 (FIG. 2, already discussed), the controller 600 (FIG. 6), and/or via components thereof (including, e.g., the control module 140 of FIG. 1 and/or the controller 210 of FIG. 2), already discussed). More particularly, the process 350 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the process 350 and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

The process 350 starts at block 360. Illustrated processing block 362 provides for determining whether a viewer (such as, e.g., the driver) of a display is wearing sunglasses. Determining whether a viewer is wearing sunglasses can be made according to any technique(s) known to a person skilled in the art. For example, in some embodiments images of the viewer are obtained from one or more of the imaging sensors $230_i$ and analyzed to determine if the viewer is wearing sunglasses. As another example, in some embodiments another sensor (e.g., photo sensor or reflection sensor) provides data to determine whether the viewer is wearing sunglasses. As another example, in some embodiments the viewer is queried and provides information (e.g., feedback) regarding wearing sunglasses.

If the viewer is not wearing sunglasses (No at block 362) the process ends at block 378. If it is determined that the viewer is wearing sunglasses (Yes at block 362, the process continues to block 364. Illustrated processing block 364 provides for determining a color of the lenses in the viewer's sunglasses. Determining the color of the lenses in the sunglasses can be made according to any technique(s) known to a person skilled in the art. For example, in some embodiments images of the sunglasses are obtained from one or more of the imaging sensors $230_i$ and analyzed to determine the color of the lenses. As another example, in some embodiments the viewer is queried and provides information (e.g., feedback) regarding the color of the lenses. In some embodiments, the color information is stored based on a previous color determination made for the particular viewer/sunglasses.

Illustrated processing block 366 provides for adjusting a color of the output of the display (e.g., the display that the viewer wearing sunglasses is viewing), based on a color of the lenses in the sunglasses or a selection by the viewer. For example, adjusting the color of the display output can include adjusting one or more of red, green, and/or blue (RGB) components of the display output; in some embodiments, the RGB settings are based on preset values in relation to the color of the lenses. In some embodiments, the display is part of a display assembly (e.g., a display assembly 220 in FIG. 2, already discussed).

Figure 8:
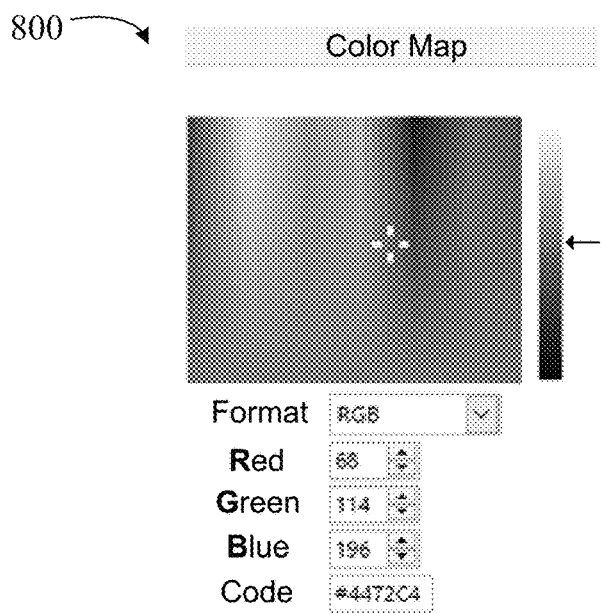
FIG. 8 provides an example user interface for presenting a color palette according to one or more embodiments.

Adjusting the color includes issuing one or more commands to the display or display assembly (e.g., via a display controller in some embodiments) to perform the color adjustment on the output of the display. In some embodiments, adjusting the color of the display output includes receiving viewer input (e.g., user selection) of one or both of a foreground color and a background color. For example, a user can be presented with a color menu or palette, such as the color palette 800 illustrated with reference to FIG. 8 (it will be understood that the palette in FIG. 8 is shown in grayscale, but in practice the palette would be presented to the viewer with actual colors), where the user can make a color selection for the foreground color and/or the background color to suit the viewer's preference for visibility.

In some embodiments, adjusting the color of the display output includes automatically selecting a color of a portion of the display output that is a color counter-balance or a complementary color in relation to the color of the lenses. For example, in some embodiments a color table is maintained that includes various potential lens colors (i.e., colors for lenses) and, for each potential lens color, an associated color selection that is a color counter-balance or complementary color for the lens color. In some embodiments, a background color of the display output is adjusted. In some embodiments, a text color or foreground color of the display output is adjusted.

In some embodiments, at illustrated processing block 368 viewer feedback is received based on the color adjustment (block 366). For example, in some embodiments viewer feedback includes commands to further adjust color and/or information regarding whether the color adjustment(s) already made have enhanced (e.g., improved) visibility and/or are sufficient. Viewer feedback can be presented, e.g., through one or more various techniques including gestures (e.g., hand gestures such as a circle, a swipe, etc.) captured by one or more imaging sensors $230_i$, touch controls captured via the touch sensor 232, voice commands (or other voice prompts/feedback) captured via the microphone 234, and/or via other controls. Otherwise, the process continues to block 372.

In some embodiments (e.g., if viewer feedback is received at block 368), at illustrated processing block 370 the process determines whether adjustments to color are completed. This determination is made based on the viewer feedback (block 368) and/or any further indication that the viewer is satisfied with the adjustments made to enhance visibility. Such further indication can include, for example, an absence of further viewer feedback within a period of time after some viewer feedback has already been provided (e.g., at block 368). If it is determined that the adjustments to color are not completed (No at block 370)—e.g., based on viewer commands or other feedback to perform additional adjustments to polarization, the process returns to block 366. In some embodiments, adjustments to color are made incrementally in response to viewer feedback, such that several adjustments may be made (e.g., in a recursive or repeating manner) until the viewer indicates that adjustments to color are completed. If it is determined that the adjustments to color are completed (Yes at block 370), the process continues to block 372.

Illustrated processing block 372 provides for adjusting brightness and/or contrast of the output of the display. In some embodiments, the display brightness and/or contrast is adjusted based on the current level of brightness or contrast of the display output. As one example, if the current level of display brightness (or contrast) is above a value (e.g., a threshold or average value) the brightness (or contrast) of the display output is reduced. In this way, power required for the display is reduced, thereby conserving power (e.g., vehicle power) consumed. As another example, if the current level of display brightness (or contrast) is below a value (e.g., a threshold or average value) the brightness (or contrast) of the display output is increased. In some embodiments, a backlight for the display is adjusted to effect a brightness or contrast adjustment. Adjusting the brightness and/or contrast includes issuing one or more commands to the display or display assembly (e.g., via a display controller in some embodiments) to perform the brightness/contrast adjustment on the output of the display.

Illustrated processing block 374 provides for receiving viewer feedback based on the brightness and/or contrast adjustment (block 372). For example, in some embodiments viewer feedback includes commands to further adjust brightness or contrast and/or information regarding whether the brightness or contrast adjustment(s) already made have enhanced (e.g., improved) visibility and/or are sufficient. Viewer feedback can be presented, e.g., through one or more various techniques including gestures (e.g., hand gestures such as a circle, a swipe, etc.) captured by one or more imaging sensors $230_i$, touch controls captured via the touch sensor 232, voice commands (or other voice prompts/feedback) captured via the microphone 234, and/or via other controls.

Illustrated processing block 376 provides for determining whether adjustments to brightness and/or contrast are completed. This determination is made based on the viewer feedback (block 374) and/or any further indication that the viewer is satisfied with the adjustments made to enhance visibility. Such further indication can include, for example, an absence of further viewer feedback within a period of time after some viewer feedback has already been provided (e.g., at block 374). If it is determined that the adjustments to brightness and/or contrast are not completed (No at block 376)—e.g., based on viewer commands or other feedback to perform additional adjustments to polarization, the process returns to block 372. In some embodiments, adjustments to brightness and/or contrast are made incrementally in response to viewer feedback, such that several adjustments may be made (e.g., in a recursive or repeating manner) until the viewer indicates that adjustments to brightness and/or contrast are completed. If it is determined that the adjustments to brightness and/or contrast are completed (Yes at block 376), the process ends at block 378.

In some embodiments, once color adjustments are completed (block 370), the brightness of the display output is reduced to a low level (before performing the second adjustment), then adjustments to increase the brightness level are made incrementally with viewer feedback (blocks 372-374) until the brightness adjustments are completed (block 376). In this way, by reducing the brightness to a low level and incrementally increasing the brightness to a desired level, a minimal acceptable brightness is set, thereby saving power consumption.

In some embodiments, additional features are available (in addition to the features performed via the process 300 and/or the process 350). For example, in some embodiments, once the polarization and brightness/contrast (or color and brightness/contrast) of the display output is adjusted for sunglasses, the respective polarization and brightness/contrast (or color and brightness/contrast) levels are set as a new baseline level for the display, to be used as long as the viewer (e.g., the driver) is wearing sunglasses. Once it is determined that the viewer (e.g., the driver) is no longer wearing sunglasses, the respective polarization and brightness/contrast (or color and brightness/contrast) levels are automatically reset to preexisting baseline (i.e., default) levels. As another example, once the polarization and brightness/contrast (or color and brightness/contrast) of the display output is adjusted for sunglasses for a particular viewer, the levels can be stored for that viewer and recalled/used again if that viewer is wearing sunglasses at a later day/time. Individualized polarization and brightness/contrast (or color and brightness/contrast) levels as determine for other sunglass-wearing viewers can similarly be stored and recalled for those viewers. Individualized preexisting baseline levels can also be stored for different viewers.

In some embodiments, the adaptive display system includes an image recognition system trained to identify particular pairs (or styles) of sunglasses or frames of sunglasses—e.g., where a viewer has multiple pairs of sunglasses. In addition, the adaptive display system can store particular settings (e.g., polarization, color, brightness and/or contrast) for each pair of sunglasses, and recall the particular settings when specific pair of sunglasses is identified as being worn by the viewer.

In some embodiments, the adaptive display system stores settings (e.g., polarization, color, brightness and/or contrast) for all displays (e.g., where there are multiple displays in a vehicle) relating to a particular pair of sunglasses. In some embodiments, the stored settings are the same for all displays; in some embodiments, the settings are specific for each display.

Turning now to FIG. 4, presented is a diagram illustrating an example side view of a display assembly 400 for use in an adaptive display system (such as the adaptive display system 200) according to one or more embodiments, with reference to components and features described herein including but not limited to the figures and associated description. In some embodiments, the display assembly 400 corresponds to a display assembly 220 (FIG. 2). The display assembly 400 includes tunable layer 410 deployed on a viewable surface of a display 412. In some embodiments the tunable layer 410 generally conforms to the shape of the display surface (e.g., any curvature of the display surface).

In some embodiments, the tunable layer 410 includes a transparent liquid crystal (LC) layer. Crystals in the LC layer can be aligned, based on an applied electric field, such that the polarization of light emitted by or through the LC layer is altered. Thus, by applying or modifying an electric field to the LC layer, e.g., via controlling a voltage applied to the LC layer, the polarization of light emitted by the display assembly 400 can be controlled.

Turning now to FIG. 5, presented is a diagram illustrating an example front view of another display assembly 500 for use in an adaptive display system (such as the adaptive display system 200) according to one or more embodiments, with reference to components and features described herein including but not limited to the figures and associated description. In some embodiments, the display assembly 500 corresponds to a display assembly 220 (FIG. 2). The display assembly 500 includes an optically polarized layer 510 rotatably arranged over a viewable surface of a display 512 (e.g., the optically polarized layer 510 is substantially parallel to the surface of the display 512). The optically polarized layer 510 can include, for example, an optically polarized plate or an optically polarized film the is (at least partially) transparent. As illustrated in FIG. 5, the optically polarized layer 510 has polarization oriented in at least one direction (for example, a vertical direction as illustrated in the figure). The optically polarized layer 510 is rotatable, for example via a motor or motorized drive (not shown in FIG. 5). When the optically polarized layer 510 is rotated, the orientation of the polarization is rotated in relation to the display surface, resulting in an adjustment in polarization of the light emitted from the display output that passes though the optically polarized layer 510.

FIG. 6 is a diagram illustrating an example of a controller 600 for an adaptive display system according to one or more embodiments, with reference to components and features described herein including but not limited to the figures and associated description. The controller 600 may correspond to the control module 140 (FIG. 1, already discussed) and/or the controller 210 (FIG. 2, already discussed). Although FIG. 6 illustrates certain components, the controller 600 may include additional or multiple components connected in various ways. It is understood that not all embodiments may necessarily include every component shown in FIG. 6. In embodiments the controller 600 includes one or more processors 602. The controller 600 can also include an I/O subsystem 604, a network interface 606, a memory 608, a data storage 610, a sensor interface 612, and/or a user interface 616. The controller 600 can also include a display 620. In some embodiments, the controller 600 interfaces with a separate display such as, e.g., a display installed as original equipment in the vehicle. In embodiments, the controller 600 interfaces with a separate display such as, e.g., one or more of the display assemblies 220 (FIG. 2, already discussed) and/or a display installed as original equipment in a vehicle.

The processor 602 includes one or more processing devices such as a microprocessor, a fixed application-specific integrated circuit (ASIC) processor, a reduced instruction set computing (RISC) processor, a complex instruction set computing (CISC) processor, a field-programmable gate array (FPGA), a digital signal processor (DSP), etc., along with associated circuitry, logic, and/or interfaces. The processor 602 can include, or be connected to, a memory (such as, e.g., the memory 608) storing executable instructions and/or data, as necessary or appropriate. The processor 602 can execute such instructions to implement, control, operate or interface with any devices or features of the adaptive display system 100, the adaptive display system 200, and/or any of the devices, features or methods described herein with reference to FIGS. 1-5 and/or 7. The processor 602 can communicate, send, or receive messages, requests, notifications, data, etc. to/from other devices, such as the devices illustrated in FIG. 2. The processor 602 can be embodied as any type of processor capable of performing the functions described herein. For example, the processor 602 can be embodied as a single or multi-core processor(s), a digital signal processor, a microcontroller, or other processor or processing/controlling circuit. The processor 602 can include embedded instructions (e.g., processor code).

The I/O subsystem 604 can include circuitry and/or components suitable to facilitate input/output operations with the processor 602, the memory 608, and other components of the controller 600.

The network interface 606 can include suitable logic, circuitry, and/or interfaces that transmits and receives data over one or more communication networks using one or more communication network protocols. The network interface 606 can operate under the control of the processor 602, and can transmit/receive various requests and messages to/from one or more other devices or components (such as, e.g., any one or more of the components illustrated in FIG. 2). The network interface 606 can include wired or wireless data communication capability; these capabilities can support data communication with a wired or wireless communication network, such as the network 607, and further including the Internet, a wide area network (WAN), a local area network (LAN), a wireless personal area network, a wide body area network, a cellular network, a telephone network, any other wired or wireless network for transmitting and receiving a data signal, or any combination thereof (including, e.g., a Wi-Fi network or corporate LAN). The network interface 606 can support communication via a short-range wireless communication field, such as Bluetooth, NFC, or RFID. Examples of network interface 606 can include, but are not limited to, an antenna, a radio frequency transceiver, a wireless transceiver, a Bluetooth transceiver, an ethernet port, a universal serial bus (USB) port, or any other device configured to transmit and receive data.

The memory 608 can include suitable logic, circuitry, and/or interfaces to store executable instructions and/or data, as necessary or appropriate, when executed, to implement, control, operate or interface with any devices or features of the adaptive display system 100 or the adaptive display system 200 and/or any of the devices, features or methods described herein with reference to FIGS. 1-5 and/or 7. The memory 608 can be embodied as any type of volatile or non-volatile-memory or data storage capable of performing the functions described herein, and can include a random-access memory (RAM), a read-only memory (ROM), write-once read-multiple memory (e.g., EEPROM), a removable storage drive, a hard disk drive (HDD), a flash memory, a solid-state memory, and the like, and including any combination thereof. In operation, the memory 608 can store various data and software used during operation of the controller 600 such as operating systems, applications, programs, libraries, and drivers. The memory 608 can be communicatively coupled to the processor 602 directly or via the I/O subsystem 604.

The data storage 610 can include any type of device or devices configured for short-term or long-term storage of data such as, for example, memory devices and circuits, memory cards, hard disk drives, solid-state drives, non-volatile flash memory, or other data storage devices. The data storage 610 can include or be configured as a database, such as a relational or non-relational database, or a combination of more than one database. In some embodiments, a database or other data storage can be physically separate and/or remote from the controller 600, and/or can be located in another computing device, a database server, on a cloud-based platform, or in any storage device that is in data communication with the controller 600.

The sensor interface 612 can include circuitry and/or components suitable to facilitate communications and/or exchange of data, commands or signals between the controller 600 and one or more sensors, which can include one or more of the imaging sensors $230_1$ (FIG. 2, already discussed).

The interconnect 614 includes any one or more separate physical buses, point to point connections, or both connected by appropriate bridges, adapters, or controllers. The interconnect 614 can include, for example, a system bus, a Peripheral Component Interconnect (PCI) bus, a Hyper-Transport or industry standard architecture bus, a small computer system interface (SCSI) bus, a universal serial bus (USB), IIC (I2C) bus, or an Institute of Electrical and Electronics Engineers (IEEE) standard 694 bus (e.g., "Fire-wire"), or any other interconnect suitable for coupling or connecting the components of the controller 600.

The user interface 616 can include code to present, on a display, information or screens for a user (e.g., a viewer, such as a vehicle driver) and to receive input (including commands) from a user via an input device (e.g., a touch-screen device).

The display 620 can be any type of device for presenting visual information, such as a computer monitor, a flat panel display, or a mobile device screen, and can include a liquid crystal display (LCD), a light-emitting diode (LED) display, a plasma panel, or a cathode ray tube display, etc. The display 620 can include a display interface for communicating with the display. In some embodiments, display 620 can include a display interface for communicating with a display external to the controller 600 (such as, e.g., a display assembly 220, FIG. 2).

In some embodiments, one or more of the illustrative components of the controller 600 can be incorporated (in whole or in part) within, or otherwise form a portion of, another component. For example, the memory 608, or portions thereof, can be incorporated within the processor 602. As another example, the user interface 616 can be incorporated within the processor 602 and/or code in the memory 608. In some embodiments, the controller 600 can be embodied as, without limitation, a mobile computing device, a smartphone, a wearable computing device, an Internet-of-Things device, a laptop computer, a tablet computer, a notebook computer, a computer, a workstation, a server, a multiprocessor system, and/or a consumer electronic device.

Figure 7:
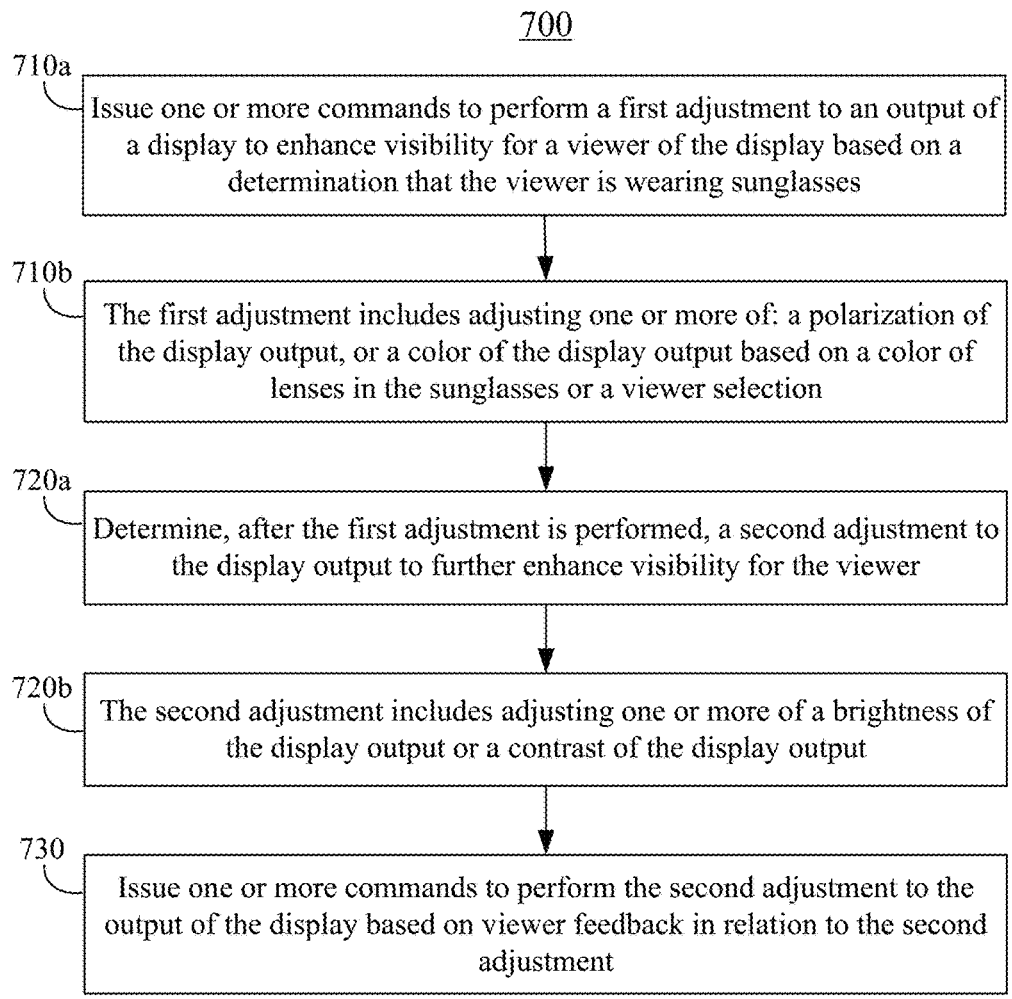
FIG. 7 provides a flow diagram illustrating an example method of controlling an adaptive display system according to one or more embodiments.

FIG. 7 provides a flow diagram illustrating an example method 700 of controlling an adaptive display system according to one or more embodiments, with reference to components and features described herein including but not limited to the figures and associated description. The method 700 can generally be implemented in the adaptive display system 100 (FIG. 1, already discussed), the adaptive display system 200 (FIG. 2, already discussed), the controller 600 (FIG. 5, already discussed), and/or via components thereof (including, e.g., the control module 140 of FIG. 1 and/or the controller 210 of FIG. 2, already discussed). More particularly, the method 700 can be implemented as one or more modules as a set of logic instructions stored in a machine- or computer-readable storage medium such as RAM, ROM, PROM, firmware, flash memory, etc., in hardware, or any combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

For example, computer program code to carry out operations shown in the method 700 and/or functions associated therewith can be written in any combination of one or more programming languages, including an object oriented programming language such as JAVA, SMALLTALK, C++ or the like and conventional procedural programming languages, such as the "C" programming language or similar programming languages. Additionally, program or logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 710a provides for issuing one or more first adjusting commands to perform a first adjustment to an output of a display to enhance visibility for a viewer of the display based on a determination that the viewer is wearing sunglasses, where at block 710b the first adjustment includes adjusting one or more of: a polarization of the display output, or a color of the display output based on a determined color of lenses in the sunglasses. In some embodiments, issuing the one or more first adjusting commands to perform the first adjustment is further based on viewer feedback in relation to the first adjustment. In some embodiments, the viewer feedback includes one or more of a gesture, a touch command, a voice command, or activating a control.

In some embodiments, the display is part of a display assembly, such as a display assembly 220 (FIG. 2, already discussed), and the first adjustment includes adjusting the polarization of the display output. In some embodiments, the display is part of a display assembly (such as a display assembly 400 in FIG. 4, already discussed) that includes a tunable layer deployed on a viewable surface of the display. In some embodiments, the tunable layer includes a transparent liquid crystal (LC) layer, where adjusting the polarization of the display output includes controlling a voltage applied to the LC layer and in a manner to cause a change in polarization of light emitted from the display. In some embodiments, the display is part of a display assembly (such as a display assembly 500 in FIG. 5, already discussed) that includes an optically polarized layer rotatably arranged over a viewable surface of the display, where adjusting the polarization of the display output includes rotating the optically polarized layer in relation to the viewable surface of the display.

In some embodiments, the first adjustment includes adjusting the color of the display output, where adjusting the color of the display output includes automatically selecting a color of a portion of the display output that is a color counter-balance or a complementary color in relation to the color of the lenses.

Illustrated processing block 720a provides for determining, after the first adjustment is performed, a second adjustment to the display output to further enhance visibility for the viewer, where at block 720b the second adjustment includes adjusting one or more of a brightness of the display output or a contrast of the display output. In some embodiments, before issuing the one or more second adjusting commands to perform the second adjustment, a command is issued to reduce a brightness of the display output to a low baseline value.

Illustrated processing block 730 provides for issuing one or more second adjusting commands to perform the second adjustment to the output of the display based on viewer feedback in relation to the second adjustment. In some embodiments, the viewer feedback includes one or more of a gesture, a touch command, a voice command, or activating a control.

Embodiments of each of the above systems, devices, components, features and/or methods, including the adaptive display system 100, the control module 140, the adaptive display system 200, the controller 210, the process 300, the process 350, the display assembly 400, the display assembly 500, the controller 600, the method 700, and/or any other system components or features, can be implemented in hardware, software, or any suitable combination thereof. For example, hardware implementations can include configurable logic, fixed-functionality logic, or any combination thereof. Examples of configurable logic include suitably configured PLAs, FPGAs, CPLDs, and general purpose microprocessors. Examples of fixed-functionality logic include suitably configured ASICs, combinational logic circuits, and sequential logic circuits. The configurable or fixed-functionality logic can be implemented with CMOS logic circuits, TTL logic circuits, or other circuits.

Alternatively, or additionally, all or portions of the foregoing systems, devices, components, features and/or methods can be implemented in one or more modules as a set of program or logic instructions stored in a machine- or computer-readable storage medium such as RAM, ROM, PROM, firmware, flash memory, etc., to be executed by a processor or computing device. For example, computer program code to carry out the operations of the components can be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages.

Additional Notes and Examples

Example S1 includes an adaptive display system comprising a sensor, a processor coupled to the sensor, and memory coupled to the processor, the memory comprising instructions which, when executed by the processor, cause the processor to perform operations comprising issuing one or more first adjusting commands to perform a first adjustment to an output of a display to enhance visibility for a viewer of the display based on a determination that the viewer is wearing sunglasses, wherein the first adjustment includes adjusting one or more of a polarization of the output of the display, or a color of the output of the display based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the output of the display or a contrast of the output of the display, and issuing one or more second adjusting commands to perform the second adjustment to the output of the display based on first viewer feedback in relation to the second adjustment.

Example S2 includes the adaptive display system of Example S1, wherein issuing the one or more first adjusting commands to perform the first adjustment is further based on second viewer feedback in relation to the first adjustment.

Example S3 includes the adaptive display system of Example S1 or S2, wherein the display is part of a display assembly that includes a tunable layer deployed on a viewable surface of the display, the tunable layer including a transparent liquid crystal layer, and wherein adjusting the polarization of the output of the display includes controlling a voltage applied to the liquid crystal layer to cause a change in polarization of light emitted from the display assembly.

Example S4 includes the adaptive display system of Example S1, S2 or S3, wherein the display is part of a display assembly that includes an optically polarized layer rotatably arranged over a viewable surface of the display, and wherein adjusting the polarization of the output of the display includes rotating the optically polarized layer in relation to the viewable surface of the display.

Example S5 includes the adaptive display system of any of Examples S1-S4, wherein adjusting the color of the output of the display includes automatically selecting a color of a portion of the output of the display that is a color counter-balance or a complementary color in relation to the color of the lenses.

Example S6 includes the adaptive display system of any of Examples S1-S5, wherein the instructions, when executed, cause the processor to perform further operations comprising before issuing the one or more second adjusting commands to perform the second adjustment, issuing a command to reduce a brightness of the output of the display to a low baseline value.

Example S7 includes the adaptive display system of any of Examples S1-S6, wherein the first viewer feedback includes one or more of a gesture, a touch command, a voice command, or activating a control.

Example M1 includes a method comprising issuing one or more first adjusting commands to perform a first adjustment to an output of a display to enhance visibility for a viewer of the display based on a determination that the viewer is wearing sunglasses, wherein the first adjustment includes adjusting one or more of a polarization of the output of the display, or a color of the output of the display based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the output of the display or a contrast of the output of the display, and issuing one or more second adjusting commands to perform the second adjustment to the output of the display based on first viewer feedback in relation to the second adjustment.

Example M2 includes the method of Example M1, wherein issuing the one or more first adjusting commands to perform the first adjustment is further based on second viewer feedback in relation to the first adjustment.

Example M3 includes the method of Example M1 or M2, wherein the display is part of a display assembly that includes a tunable layer deployed on a viewable surface of the display, the tunable layer including a transparent liquid crystal layer, and wherein adjusting the polarization of the output of the display includes controlling a voltage applied to the liquid crystal layer to cause a change in polarization of light emitted from the display assembly.

Example M4 includes the method of Example M1, M2 or M3, wherein the display is part of a display assembly that includes an optically polarized layer rotatably arranged over a viewable surface of the display, and wherein adjusting the polarization of the output of the display includes rotating the optically polarized layer in relation to the viewable surface of the display.

Example M5 includes the method of any of Examples M1-M4, wherein adjusting the color of the output of the display includes automatically selecting a color of a portion of the output of the display that is a color counter-balance or a complementary color in relation to the color of the lenses.

Example M6 includes the method of any of Examples M1-M5, further comprising before issuing the one or more second adjusting commands to perform the second adjustment, issuing a command to reduce a brightness of the output of the display to a low baseline value.

Example M7 includes the method of any of Examples M1-M6, wherein the first viewer feedback includes one or more of a gesture, a touch command, a voice command, or activating a control.

Example C1 includes at least one non-transitory computer readable storage medium comprising instructions which, when executed by a processor, cause the processor to perform operations comprising issuing one or more first adjusting commands to perform a first adjustment to an output of a display to enhance visibility for a viewer of the display based on a determination that the viewer is wearing sunglasses, wherein the first adjustment includes adjusting one or more of a polarization of the output of the display, or a color of the output of the display based on a color of lenses in the sunglasses or a selection by the viewer, determining, after the first adjustment is performed, a second adjustment to the output of the display to further enhance visibility for the viewer, wherein the second adjustment includes adjusting one or more of a brightness of the output of the display or a contrast of the output of the display, and issuing one or more second adjusting commands to perform the second adjustment to the output of the display based on first viewer feedback in relation to the second adjustment.

Example C2 includes the at least one non-transitory computer readable storage medium of Example C1, wherein issuing the one or more first adjusting commands to perform the first adjustment is further based on second viewer feedback in relation to the first adjustment.

Example C3 includes the at least one non-transitory computer readable storage medium of Example C1 or C2, wherein the display is part of a display assembly that includes a tunable layer deployed on a viewable surface of the display, the tunable layer including a transparent liquid crystal layer, and wherein adjusting the polarization of the output of the display includes controlling a voltage applied to the liquid crystal layer to cause a change in polarization of light emitted from the display assembly.

Example C4 includes the at least one non-transitory computer readable storage medium of Example C1, C2 or C3, wherein the display is part of a display assembly that includes an optically polarized layer rotatably arranged over a viewable surface of the display, and wherein adjusting the polarization of the output of the display includes rotating the optically polarized layer in relation to the viewable surface of the display.

Example C5 includes the at least one non-transitory computer readable storage medium of any of Examples C1-C4, wherein adjusting the color of the output of the display includes automatically selecting a color of a portion of the output of the display that is a color counter-balance or a complementary color in relation to the color of the lenses.

Example C6 includes the at least one non-transitory computer readable storage medium of any of Examples C1-C5, wherein the instructions, when executed, cause the processor to perform further operations comprising before issuing the one or more second adjusting commands to perform the second adjustment, issuing a command to reduce a brightness of the output of the display to a low baseline value.

Example C7 includes the at least one non-transitory computer readable storage medium of any of Examples C1-C6, wherein the first viewer feedback includes one or more of a gesture, a touch command, a voice command, or activating a control.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections, including logical connections via intermediate components (e.g., device A may be coupled to device C via device B). In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An adaptive display system comprising:
   a sensor;
   a processor coupled to the sensor; and
   memory coupled to the processor, the memory comprising instructions which, when executed by the processor, cause the processor to perform operations comprising:
      issuing one or more first adjusting commands to perform a first adjustment to an output of a display to enhance visibility for a viewer of the display based on a determination that the viewer is wearing sunglasses,
      wherein the first adjustment includes adjusting at least a polarization of the output of the display;
      determining, after the first adjustment is performed, a second adjustment to the output of the display to further enhance visibility for the viewer, wherein the second adjustment includes adjusting one or more of a brightness of the output of the display or a contrast of the output of the display; and
      issuing one or more second adjusting commands to perform the second adjustment to the output of the display based on first viewer feedback in relation to the second adjustment,
      wherein the display is part of a display assembly that includes a tunable layer deployed on a viewable surface of the display, the tunable layer including a transparent liquid crystal layer, and
      wherein adjusting the polarization of the output of the display includes controlling a voltage applied to the liquid crystal layer to cause a change in polarization of light emitted from the display assembly.

2. The adaptive display system of claim 1, wherein issuing the one or more first adjusting commands to perform the first adjustment is further based on second viewer feedback in relation to the first adjustment.

3. An adaptive display system comprising:
   a sensor;
   a processor coupled to the sensor; and
   memory coupled to the processor, the memory comprising instructions which, when executed by the processor, cause the processor to perform operations comprising:
      issuing one or more first adjusting commands to perform a first adjustment to an output of a display to enhance visibility for a viewer of the display based on a determination that the viewer is wearing sunglasses,
      wherein the first adjustment includes adjusting at least a polarization of the output of the display;
      determining, after the first adjustment is performed, a second adjustment to the output of the display to further enhance visibility for the viewer, wherein the second adjustment includes adjusting one or more of a brightness of the output of the display or a contrast of the output of the display; and issuing one or more second adjusting commands to perform the second adjustment to the output of the display based on first viewer feedback in relation to the second adjustment, wherein the display is part of a display assembly that includes an optically polarized layer rotatably arranged over a viewable surface of the display, and wherein adjusting the polarization of the output of the display includes rotating the optically polarized layer in relation to the viewable surface of the display.

4. The adaptive display system of claim 1, wherein the instructions, when executed, cause the processor to perform further operations comprising:

before issuing the one or more second adjusting commands to perform the second adjustment, issuing a command to reduce a brightness of the output of the display to a low baseline value.

5. The adaptive display system of claim 1, wherein the first viewer feedback includes one or more of a gesture, a touch command, a voice command, or activating a control.

6. A method comprising:

issuing one or more first adjusting commands to perform a first adjustment to an output of a display to enhance visibility for a viewer of the display based on a determination that the viewer is wearing sunglasses, wherein the first adjustment includes adjusting at least a polarization of the output of the display;

determining, after the first adjustment is performed, a second adjustment to the output of the display to further enhance visibility for the viewer, wherein the second adjustment includes adjusting one or more of a brightness of the output of the display or a contrast of the output of the display; and issuing one or more second adjusting commands to perform the second adjustment to the output of the display based on first viewer feedback in relation to the second adjustment, wherein the display is part of a display assembly that includes a tunable layer deployed on a viewable surface of the display, the tunable layer including a transparent liquid crystal layer, and wherein adjusting the polarization of the output of the display includes controlling a voltage applied to the liquid crystal layer to cause a change in polarization of light emitted from the display assembly.

7. The method of claim 6, wherein issuing the one or more first adjusting commands to perform the first adjustment is further based on second viewer feedback in relation to the first adjustment.

8. A method comprising:

issuing one or more first adjusting commands to perform a first adjustment to an output of a display to enhance visibility for a viewer of the display based on a determination that the viewer is wearing sunglasses, wherein the first adjustment includes adjusting at least a polarization of the output of the display;

determining, after the first adjustment is performed, a second adjustment to the output of the display to further enhance visibility for the viewer, wherein the second adjustment includes adjusting one or more of a brightness of the output of the display or a contrast of the output of the display; and issuing one or more second adjusting commands to perform the second adjustment to the output of the display based on first viewer feedback in relation to the second adjustment, wherein the display is part of a display assembly that includes an optically polarized layer rotatably arranged over a viewable surface of the display, and wherein adjusting the polarization of the output of the display includes rotating the optically polarized layer in relation to the viewable surface of the display.

9. The method of claim 6, further comprising:

before issuing the one or more second adjusting commands to perform the second adjustment, issuing a command to reduce a brightness of the output of the display to a low baseline value.

10. The method of claim 6, wherein the first viewer feedback includes one or more of a gesture, a touch command, a voice command, or activating a control.

11. At least one non-transitory computer readable storage medium comprising instructions which, when executed by a processor, cause the processor to perform operations comprising:

issuing one or more first adjusting commands to perform a first adjustment to an output of a display to enhance visibility for a viewer of the display based on a determination that the viewer is wearing sunglasses, wherein the first adjustment includes adjusting at least a polarization of the output of the display;

determining, after the first adjustment is performed, a second adjustment to the output of the display to further enhance visibility for the viewer, wherein the second adjustment includes adjusting one or more of a brightness of the output of the display or a contrast of the output of the display; and issuing one or more second adjusting commands to perform the second adjustment to the output of the display based on first viewer feedback in relation to the second adjustment, wherein the display is part of a display assembly that includes a tunable layer deployed on a viewable surface of the display, the tunable layer including a transparent liquid crystal layer, and wherein adjusting the polarization of the output of the display includes controlling a voltage applied to the liquid crystal layer to cause a change in polarization of light emitted from the display assembly.

12. The at least one non-transitory computer readable storage medium of claim 11, wherein issuing the one or more first adjusting commands to perform the first adjustment is further based on second viewer feedback in relation to the first adjustment.

13. At least one non-transitory computer readable storage medium comprising instructions which, when executed by a processor, cause the processor to perform operations comprising:

issuing one or more first adjusting commands to perform a first adjustment to an output of a display to enhance visibility for a viewer of the display based on a determination that the viewer is wearing sunglasses, wherein the first adjustment includes adjusting at least a polarization of the output of the display;

determining, after the first adjustment is performed, a second adjustment to the output of the display to further enhance visibility for the viewer, wherein the second adjustment includes adjusting one or more of a brightness of the output of the display or a contrast of the output of the display; and issuing one or more second adjusting commands to perform the second adjustment to the output of the display based on first viewer feedback in relation to the second adjustment, wherein the display is part of a display assembly that includes an optically polarized layer rotatably arranged over a viewable surface of the display, and wherein adjusting the polarization of the output of the display includes rotating the optically polarized layer in relation to the viewable surface of the display.

14. The at least one non-transitory computer readable storage medium of claim 11, wherein the instructions, when executed, cause the processor to perform further operations comprising:

before issuing the one or more second adjusting commands to perform the second adjustment, issuing a command to reduce a brightness of the output of the display to a low baseline value.

* * * * *